Nov. 8, 1955  G. KUHN  2,722,919
FLUID PRESSURE OPERATED MOTOR
Filed March 9, 1951  4 Sheets-Sheet 1

INVENTOR
George Kuhn
BY George Lynn DeMott
ATTORNEY

Nov. 8, 1955  G. KUHN  2,722,919
FLUID PRESSURE OPERATED MOTOR
Filed March 9, 1951  4 Sheets-Sheet 2
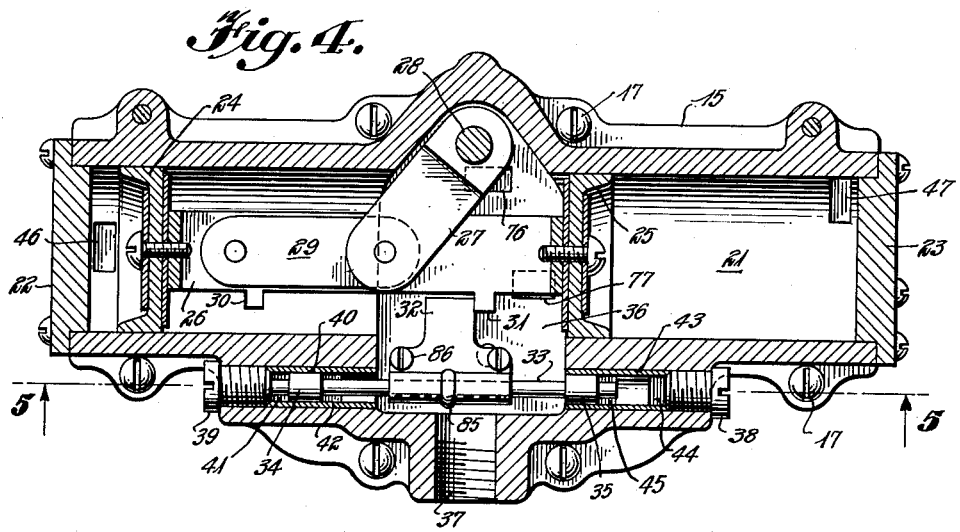
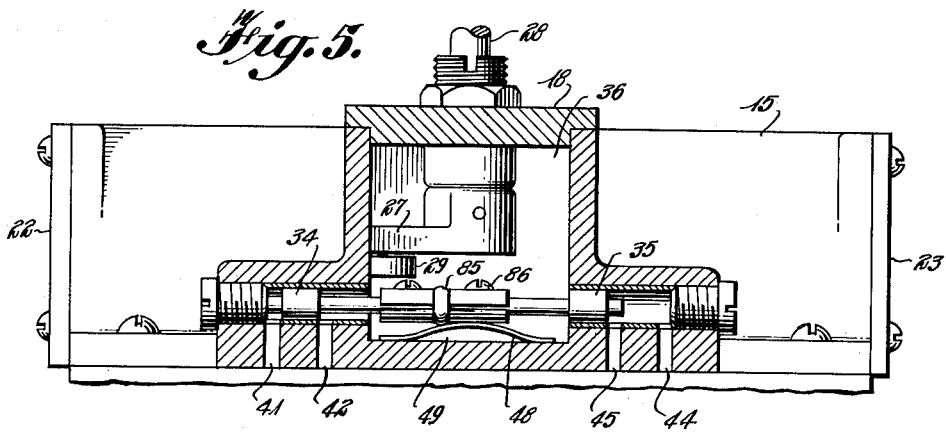
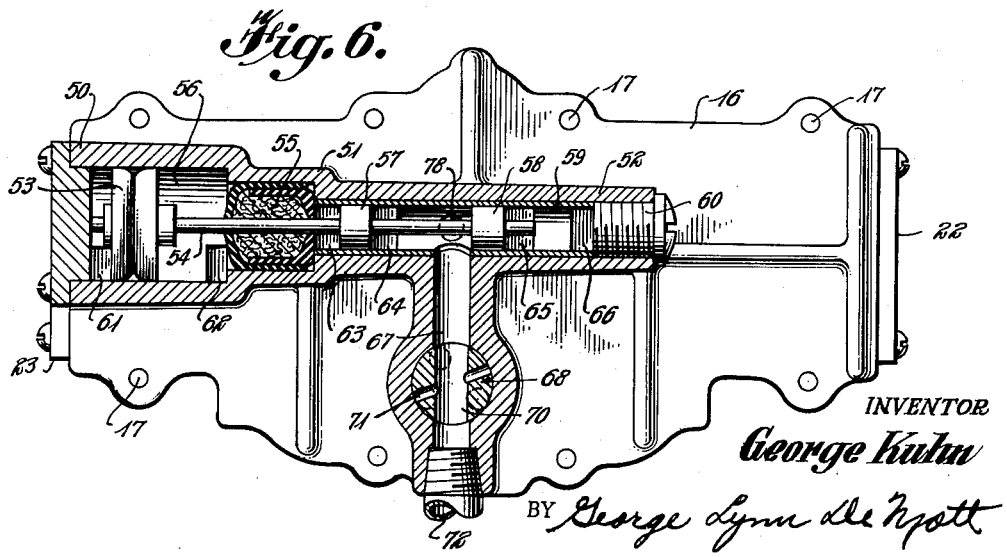
INVENTOR
George Kuhn
BY George Lynn de Nyott
ATTORNEY Nov. 8, 1955     G. KUHN     2,722,919
FLUID PRESSURE OPERATED MOTOR
Filed March 9, 1951     4 Sheets—Sheet 3

INVENTOR
George Kuhn
BY George Lynn DeMott
ATTORNEY

Nov. 8, 1955  G. KUHN  2,722,919
FLUID PRESSURE OPERATED MOTOR
Filed March 9, 1951  4 Sheets-Sheet 4
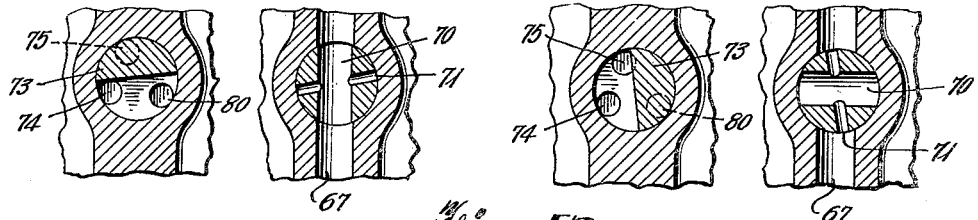
Fig. 10ᵃ  Fig. 10ᵇ  Fig. 11ᵃ  Fig. 11ᵇ
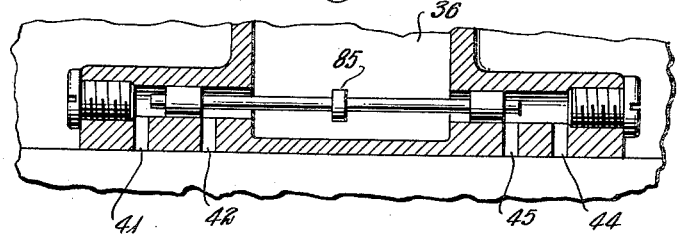
Fig. 12.
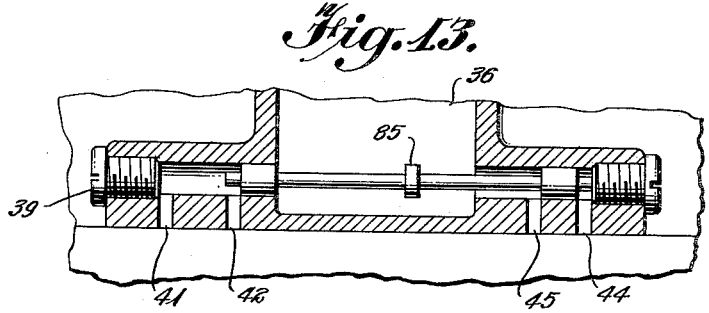
Fig. 13.
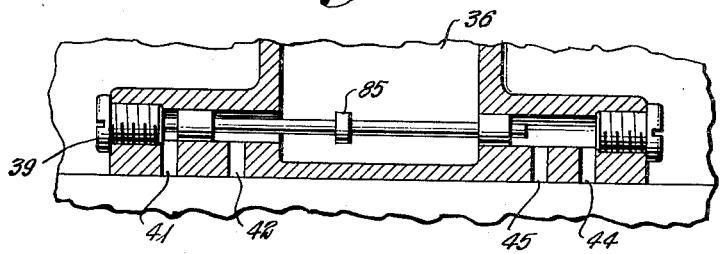
Fig. 14.
INVENTOR
George Kuhn
BY George Lynn deMott
ATTORNEY United States Patent Office 2,722,919
Patented Nov. 8, 1955

2,722,919

FLUID PRESSURE OPERATED MOTOR

George Kuhn, Silver Spring, Md.

Application March 9, 1951, Serial No. 214,660

12 Claims. (Cl. 121—157)

This invention relates to fluid pressure operated motors, and particularly to motors for operating automotive auxiliaries such as windshield wipers and the like. While the invention is adapted for operation by different types of fluid pressure, it will, by way of illustration only, be described in connection with a windshield wiper operated by a source of hydraulic pressure such as the conventional oil pump of an internal combustion engine regardless of the type of vehicle to which the device is applied. For example, the vehicle could be an automobile, an airplane or a ship.

The main object of the invention is to provide a fluid pressure operated motor requiring a minimum of machine work in its production, and of greater simplicity and reliability than those of the prior art.

Another object of the invention is to provide a motor in which the working parts will always return to their starting positions when the motor is stopped; which will operate at substantially uniform speed throughout its working stroke; which will be held in its starting position when deactivated, and which may be equipped with means to provide slight over-travel beyond its working stroke when it is deactivated.

Still another object of the invention is to provide means continuously effective to prevent undesired shifting of the working parts of the motor, when they are subjected to severe mechanical vibration, or to centrifugal action, as when the vehicle on which the motor is mounted is rounding a curve at high speed, or turns abruptly.

Another object is to provide a construction which permits making changes in the cross-sectional areas of the passageways without affecting the rest of the motor.

Other objects and advantages will appear from the following description when it is read in connection with the drawings in which Figure 1 is a rear elevation of one form of fluid pressure operated motor embodying the invention;

Fig. 4 is a longitudinal section taken on the line 4—4 of Fig. 3, showing means for actuating the pilot valve which controls the motor;

Fig. 5 is a section on line 5—5 of Fig. 4, showing the pilot valve from another angle, and illustrating means for holding the pilot valve in fixed position to prevent its being moved by mechanical vibration to which the motor may be subjected, or by accidental drag of other moving parts.

Fig. 6 is a sectional view taken on the line 6—6 of Fig. 3;

Figs. 10a and 10b are sectional views taken on lines a—a and b—b, respectively, of the valve shown in Fig. 9, with the valve disposed in its housing and in its "working" position;

Figs. 11a and 11b are sectional views, similar to Figs. 10a and 10b, showing the valve in the parking position; and Figs. 12, 13 and 14 are sectional views showing the pilot valve of the invention in different positions; Figs. 12 and 13 representing the parts in working positions, and Fig. 14 representing it in starting position, permitting overtravel of the power piston when the motor is deactivated.

The motor in question is of the positive displacement type. It is designed to be driven by any aeriform fluid or liquid under positive or negative pressure. As such it may be driven by oil, water, hydraulic fluid, steam, air, gas or vacuum.

In its illustrated form it consists of two die-cast or similarly preformed housings, which contain a minimum of simple working parts, and which terminate in matching, preferably flat, surfaces adapted to be clamped together. One, or both of these surfaces are provided with an open labyrinth of relatively shallow grooves, which terminate at ports leading into the operating chambers located within the housings. Thus, when the two housings are clamped together, the open labyrinth of grooves becomes converted into an internal layer of closed and fluid-tight passageways, effectively interconnecting all the working parts of the device in operative relationship and, thereby, eliminating the need of complicated internal coring, drilling and boring, such as usually characterize devices of this nature. This passage layer, which becomes formed within the body of the device upon its assembly, represents a major short-cut in manufacture and is, in this respect, somewhat akin to the so-called "printed circuit," the use of which has greatly simplified and cheapened the production of electronic devices.

As, prior to assembly, the grooves lie exposed upon the faces of the housings, their cross-sectional area may be reduced when needed by simply planing off a layer of the housing surface without in any way affecting the rest of the device. Since the resistance to the flow of the fluid is directly proportional to the square of its velocity and inversely proportional to the cross-sectional area of the passage, the passage layer also serves as an automatic damper, which effectively prevents the device from "running wild." The limiting speed of the device thus may be easily preset by properly adjusting the thickness of the passage layer to suit the viscosity of the fluid to be used in the device.

Figure 1:
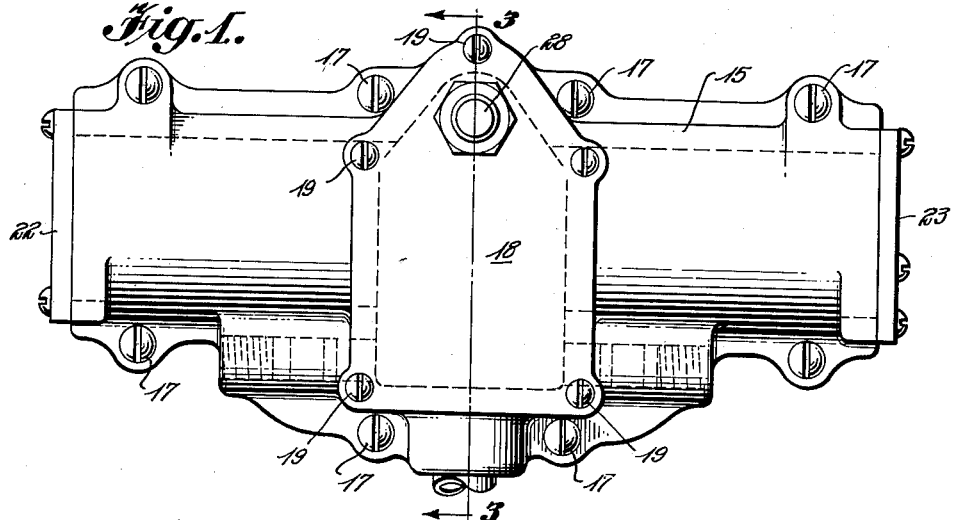
Figure 2:
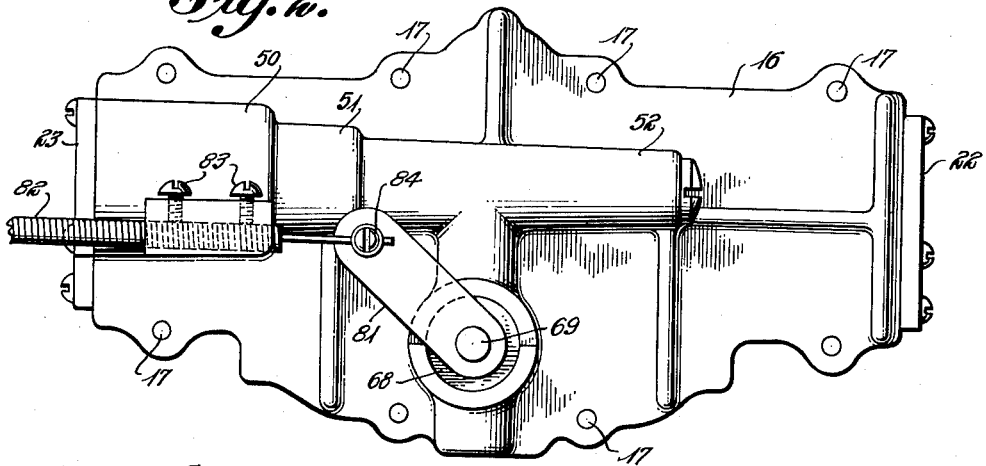
Fig. 2 is a front elevation of the motor shown in Fig. 1.

In describing the invention, reference may be had first to Figs. 1 and 2, wherein reference characters 15 and 16 designate, respectively, the power and control housings of the motor, which contain several operating chambers within which the actuating mechanism of the motor operates. An important feature of the invention is an arrangement wherein the operating chambers in the power housing are divorced completely from those in the control housing of the motor, the grooves and ports of the passage layer serving as sole means of communication between the control housing and the power housing. As previously shown, this passage layer is located in a single plane which does not pass through any of the chambers in either of the housings. This arrangement results in several important advantages. From the standpoint of service, it permits individual replacement of a damaged housing without affecting the rest of the device. During manufacture, it permits assembly of a great variety of motors from a small variety of housings. Thus, the same control housing may be used in combination with power housings of various power outputs, piston strokes and angular rotations of the actuating shaft. When motors of low speed and high internal fluid resistance are required, the thickness of the fluid passage layer may be easily reduced, as explained above. When, on the other hand, high speed or exceptionally low resistance are desired, the thickness of the fluid passage layer may be augmented by introduction between the housing faces of a slotted passage plate, as shown in my United States Patent No. 2,635,586 granted April 21, 1953.

Figure 3:
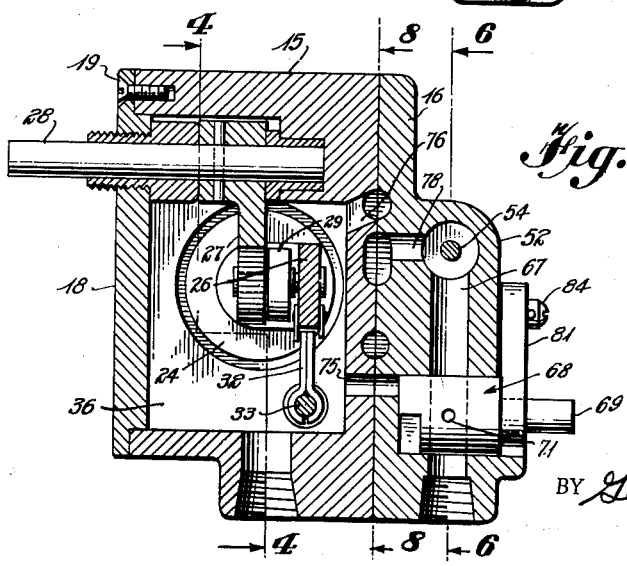
Fig. 3 is a transverse section on the line 3—3 of Fig. 1.
Figure 7:
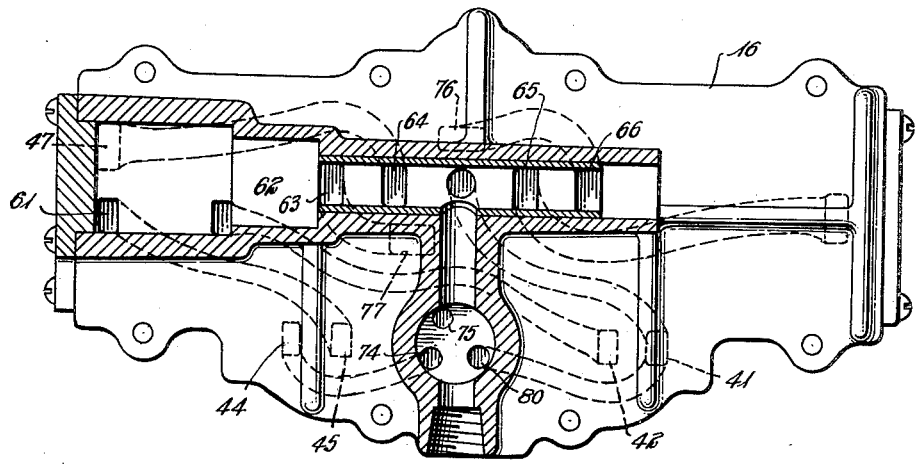
Fig. 7 is a combined sectional and phantom view showing the actuating fluid grooves and ports in the face of the control housing, the view being taken from the front of the motor as in Fig. 2.
Figure 8:
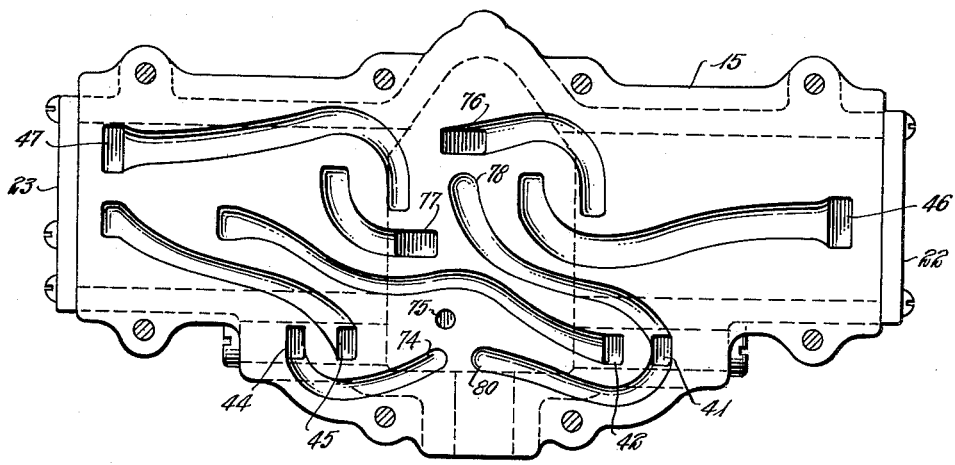
Fig. 8 is a front face view of the power housing of Fig. 1, indicating the actuating fluid passageways and ports.

As will be apparent from Fig. 3, the two housings 15 and 16 are held together in abutting relation by any appropriate means such as the screws 17 shown in Fig. 1. The rear of the housing 15 and the exhaust chamber 36 therein, are closed by a removable plate 18 held in place by suitable securing means such as the screws 19.

Referring now to Fig. 4, the power housing 15 contains a cylindrical piston chamber 21 closed at its ends by plates 22 and 23. This chamber contains power pistons 24 and 25 connected by a yoke 26, and this yoke through link 29 and crank 27 drives an actuating shaft 28 to which a wiper arm or the like may be attached. Yoke 26 is provided with abutments 30 and 31 cooperating with a pilot valve actuator 32 which will be later described.

The power housing 15, in addition to the piston chamber 21, also contains a sliding type pilot valve comprising a stem 33 provided with a centrally positioned collar 85 on which the actuator 32 is clamped by means of screws 86 and which carries adjacent its free ends, valve bodies 34 and 35. These bodies are movable in two cylindrical chambers, one disposed on either side of the exhaust chamber 36. The travel of pilot valve stem 33 is limited by the threaded plugs 38 and 39 which are screwed into the ends of the chambers. The chamber in which body 34 moves contains a liner 40 having ports 41 and 42 therein. The body 35 similarly cooperates with the liner 43 containing two ports 44 and 45. The pilot valve is actuated by engagement between the abutments 30 and 31 carried on yoke 26 and the actuator 32 carried by the valve stem 33. As shown in Figures 4 and 5, the power pistons 24 and 25, as well as the pilot valve bodies 34, 35 occupy their extreme left hand positions and the abutment 31 is in contact with the pilot valve actuator 32. It will be seen that, when pistons 24 and 25 move to the right and closely approach the limit of their motion, the abutment 30 on yoke 26 strikes the actuator 32 to move the pilot valve to the right and prepare the porting for reverse movement. As the pilot valve assembly slides quite freely in liners 40, 43, it is important to prevent its accidental displacement, which would result in premature reversal of the power pistons. To this end, there is associated with the pilot valve, as shown in Figure 5, a leaf spring 48 which bears against the actuator 32 and the inside face 49 of the power housing. The tension in this spring provides sufficient friction to prevent the pilot valve assembly from being displaced by partial unbalances of liquid pressure upon its ends, by jars or by centrifugal action as when the vehicle on which the device is carried turns abruptly. Thus, by a relatively simple construction the pilot valve assembly remains wherever it is positioned by the cooperation between the actuator 32 and the abutments 30 and 31.

As pointed out above, the control housing is attached to and cooperates with the power housing to complete the porting of the motor. The cooperation of these parts will be better understood after the structure of the control housing is described. This control housing, designated by reference character 16, is shown in Figures 2, 3, 6 and 7 to which reference will now be had. From Figure 2 it will be seen that the body of the casting includes an elongated, tapered projection comprising three portions of gradually reduced sizes and designated 50, 51 and 52. The portion 50 adjacent one end of the housing contains a master valve piston 53 of usual structure, having a stem 54 passing through a packing 55, which packing isolates the piston chamber 56 from the chamber within which the master valve bodies 57 and 58 carried by stem 54 are movable. The packing 55 is disposed within the housing portion 51, while the housing portion 52 contains a liner 59 held in position by a threaded plug 60 which also closes the master valve chamber. Communicating with the piston chamber 56 on the two sides thereof are ports 61 and 62 which may be supplied with pressure fluid alternately to determine the position of the master valve and hence determine the direction of actuation of the power pistons 24 and 25 in the power housing. The bodies 57 and 58 serve to control the porting, there being ports 63 and 64 associated with body 57 and ports 65 and 66 associated with body 58.

Figure 9:
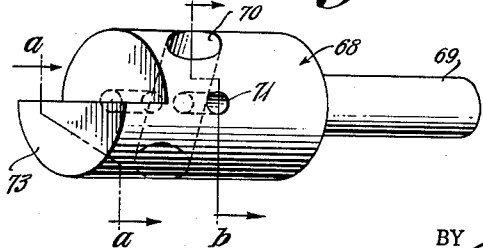
Fig. 9 is a detail perspective view of the speed control and parking valve which is one of the features of the invention.

The reduced portion 52 of the control housing includes a lateral branch containing a fluid pressure supply duct 67 which is enlarged to receive a control valve designated generally by the reference character 68 and shown in detail in Figure 9. This control valve comprises an actuating stem 69 attached to the cylindrical valve body, this body containing a diametral duct 70 corresponding in diameter to the pressure fluid supply duct 67 and a transverse and smaller bleeder duct 71. When the duct 70 is in alignment with the passageway 67, pressure fluid is supplied to the master valve chamber from a suitable source of fluid connected to pipe 72. This is the position indicated in Figures 6 and 10b. When the valve is turned to the position of Figure 11b, pressure fluid flows from the source 72 through the bleeder duct 71 into the master valve chamber to exert a biasing pressure on the operating mechanism and to assure that it will return to and remain in zero or "starting" position.

The valve 68 also has a segmental projection 73 which cooperates with three ports 74, 75 and 80 in the back side of control housing 16, as seen in Figs. 6, 10a and 11a. When the valve 68 is in running position, the part 73 occupies the position of Figure 10a in which ports 74 and 80 are connected. When the valve 68 is in its Fig. 11b position, the ports 74 and 75 are connected, as shown in Figure 11a, and the port 80 is blanked.

The operation of the motor will now be described. It will first be assumed that the parts occupy the positions shown in the drawings and that a source of pressure fluid, such as engine oil, is supplied to the passageway 67 through pipe 72, as shown in Figure 6. When the valve 68 is moved to the position shown in Figures 10a and 10b pressure fluid enters the master valve chamber 52 and passes through port 64 and its connecting passageway to port 47, thereby filling the piston chamber 21 and holding the pistons 24, 25 in the extreme left hand position of Figure 4 until such time as the master valve shifts. It will be understood that the control valve 68 is connected to a controlling means such as a Bowden wire 82, which is attached by means 83 and 84 to a control arm 81 secured to valve shaft 69.

Fluid also passes from passageway 67 through port 78 to port 41 and, via ports 80, 74, to port 44. The pilot valve being in Fig. 4 position, the fluid passes through ports 44, 45 to port 61 behind the piston 53 and moves this piston to the right in Figure 6, while fluid in chamber 56 is displaced through port 62 and port 42 to the exhaust chamber 36. This causes the master valve bodies 57, 58 to move to the right, thereby connecting port 78 with port 65 and port 64 with port 63. The fluid then passes through ports 65 and 46 into chamber 21 behind piston 24. This causes pistons 24, 25 to move to the right in Fig. 4, while the fluid behind piston 25 moves through ports 47, 64, 63 and 77 into exhaust chamber 36. As pistons 24, 25 approach their right hand position, abutment 30 engages actuator 32 and moves the pilot valve assembly into Fig. 13 position. Thereupon, the fluid from port 41 passes through ports 42 and 62 into chamber 56 and restores piston 53 and master valve bodies 57, 58 to their original positions of Fig. 6. This causes the fluid to pass through ports 64 and 47 into chamber 21 and move pistons 24, 25 into their original position of Fig. 4, whereupon the whole cycle is repeated.

In actual operation the movement of piston 53 is virtually instantaneous because of its short stroke and relatively small diameter, with the result that power pistons 24, 25 reverse their motion virtually simultaneously with shifting of the pilot valve assembly to positions shown in Figs. 12, 13, which positions determine the working stroke of the power pistons. It should be noted that Figs. 12, 13, 14 show a modification of the structure shown in Figs. 4 and 5 in that there is an extra space provided which permits the pilot valve assembly and, consequently, the power pistons 24, 25 to move beyond their working stroke positions in the left-hand direction only. The purpose of this provision is to permit the windshield wiper blades to operate without striking the windshield frame and to cause the blades to fold against the frame when not in use. How this is accomplished will now be explained.

The control valve 68, which is manually operated, is shown in Figs. 6 and 10b in its full "on" position, which permits the motor to operate at its full speed. Turning this valve clockwise restricts the flow of fluid and gradually slows down the motor until the fluid is cut off completely and all motion stops. However, when valve 68 is turned still farther into position shown in Fig. 11b, a bleeder passage 71 is opened, again permitting a small flow of fluid into the motor. At the same time, as shown in Fig. 11a, projection 73 of valve 68 blocks off supply port 80 and uncovers port 75 which leads into exhaust chamber 36. This arrangement biases piston 53 to move into and remain in the position shown in Fig. 6, which position it assumes as soon as ports 41, 42 become connected, and where it must remain as long as port 80 remains blocked.

With the master valve thus remaining in Fig. 6 position the fluid passes through ports 64 and 47 into chamber 21 and drives pistons 24, 25 toward their Fig. 4 position. However, as abutment 31 engages actuator 32 and moves the pilot valve into Fig. 12 position, no reversal of motion can take place and pistons 24, 25 continue moving beyond their normal stroke until pilot valve stem 33 is stopped by plug 39 in Fig. 14 position. Thus, when bleeder 71 is opened, the windshield wiper blades fold quietly and smoothly against the windshield frame, where they remain maintained in their position by the biasing pressure.

Whereas vacuum operated wipers are notoriously irregular in operation and electrically driven ones are expensive, subject to breakdowns and are usually capable of only two speeds, the above invention is inexpensive, trouble free, silent in operation, uniform in action and capable of running at any chosen speed within its range. Due to its fluidtight nature it is particularly suited for use on military vehicles, such as jeeps and trucks equipped to be driven under water. Although, as herein described, oil under pressure derived from the engine lubricating pump is utilized to drive the motor, any other source of fluid under relatively uniform pressure may be employed.

It will be apparent that the above invention is also capable of driving many other oscillatory or reciprocating mechanisms, such as photographic rockers, chemical mixers, washing machine agitators and the like. Furthermore, its unique delayed cut-off feature permits it to be operated on a single cycle basis for driving such devices as stamping presses, gun and cartridge chargers, automatic door openers, and the like.

It is to be understood that the embodiments shown and described herein are merely illustrative of my invention and I do not limit myself except as determined in the following claims.

I claim:

1. A fluid pressure motor comprising a power housing and a control housing, each being chambered and containing portions of axial passageways which upon assembly of the two housings unite to form a closed system of passageways to operatively connect said chambers, an actuated member, piston means in said power housing for driving said member, master valve means in said control housing for causing pressure fluid to be supplied alternately to the chambers of the power housing to cause reciprocation of said piston means, and control valve means effective in its deactivated position to cause said master valve means to be biased by pressure fluid continuously in one direction, whereby the reciprocating motion of said piston means is changed to unidirectional thrust.

2. The combination set forth in claim 1, wherein the body of said control valve means is provided with a main flow control passage and an auxiliary bleeder passage, both said passages being located in the same line of flow, and with an integral valve means for altering the porting of said master valve means, whereby said master valve means is caused to reciprocate when said main passage is open and is caused to be unidirectionally biased when said auxiliary passage is open.

3. A fluid pressure motor comprising a chamber having a reciprocable piston therein, a source of pressure fluid, an unbiased pilot valve having a chamber and actuated by said piston, control valve means for controlling the flow of fluid from said source to said pilot valve chamber, and mechanical restraining means for biasing said pilot valve means in any one of its piston actuated positions.

4. A fluid pressure operated motor comprising a power means housing and a control means housing, said housings each containing a plurality of ported operating chambers and each having a flattened face, all the port openings of said chambers being located on said faces, at least one of said faces being embossed with a series of open-topped non-overlapping grooves, which, upon securing said faces together in mutually abutting relationship, form a completely enclosed system of passageways operatively interconnecting all the chambers in both said housings, and means for securing said housings in operative relation to each other.

5. A reciprocable fluid pressure actuated motor comprising a closed chamber having a reciprocable piston therein, fluid operated valve means for causing the application of pressure fluid alternately to opposite ends of said piston, a control valve for admitting or cutting off the supply of fluid to said fluid operated valve means, and means integral with said control valve for altering the porting of said fluid operated valve means when said control valve is turned off.

6. A reciprocable fluid pressure actuated motor comprising a closed chamber having a reciprocable piston therein, fluid operated valve means for causing the application of pressure fluid alternately to opposite ends of said piston, a control valve for admitting or cutting off the supply of fluid to said fluid operated valve means and bleeder means in said control valve for causing said fluid operated valve means to be biased continuously in one direction when the control valve is turned off.

7. A fluid pressure motor comprising a chamber having a reciprocable power piston therein, a master valve for controlling the supply of pressure fluid to said chamber, pilot valve means for controlling the supply of pressure fluid to said master valve, and mechanical restraining means for holding said pilot valve means in any position to which it is actuated.

8. A fluid pressure motor characterized by the complete absence of cored fluid passageways and comprising a chambered power housing and a chambered control housing, each having a flattened face in non-intersecting relation to its chambers, at least one of said faces having fluid grooves therein, and means for securing the two housings together with their flattened faces in abutting relation to operatively connect the chambers of said two housings.

9. A fluid pressure operated motor comprising a power cylinder having a reciprocating piston therein, pilot valve means actuated by said piston, control valve means for supplying pressure fluid to said pilot valve means to cause reversal of said reciprocating piston, and means forming a part of said pilot valve means for permitting overtravel of said reciprocating piston in one extreme position of the same.

10. A fluid pressure operated motor comprising a housing means containing a power piston and a fluid pressure operated master valve for controlling the same, a fluid supply passage, a control valve located in the line of flow of said fluid supply passage, said control valve being provided with a relatively large main opening and a relatively small auxiliary opening, said openings being arranged so as to be alternately interposed to the line of flow through said passage, and means integral with said control valve and effective when said main opening is closed for altering the porting leading to said master valve to cause said master valve to become unidirectionally biased by the fluid pressure supplied through said auxiliary opening.

11. A fluid pressure operated motor comprising a housing means containing a power piston, a pilot valve and a master valve for controlling said power piston, a control valve having a main fluid passage and an auxiliary fluid passage, means effective when said main passage is closed for causing said auxiliary passage to supply unidirectional biasing pressure to said master valve, and means forming a part of said pilot valve for permitting said power piston to overtravel in one direction when said master valve is in its biasing position.

12. A fluid pressure motor comprising a body having two opposed and uniaxial cylindrical piston chambers therein, a yoke carrying two piston heads reciprocable in said chambers, said yoke having two spaced abutments, an unbiased pilot valve slidably mounted in said body and equipped with means engageable by said abutments for positive displacement of said pilot valve upon reciprocation of said yoke, and restraining means preventing free motion of said pilot valve independently of positive engagement with said abutments.

References Cited in the file of this patent

UNITED STATES PATENTS

| | | |
|---|---|---|
| 119,088 | Johnson | Sept. 19, 1871 |
| 827,428 | Davis | July 31, 1906 |
| 1,674,056 | Oishei et al. | June 19, 1928 |
| 1,840,233 | Hueber | Jan. 5, 1932 |
| 2,029,240 | Kuhn | Jan. 28, 1936 |
| 2,202,023 | Parker | May 28, 1940 |
| 2,516,558 | Freedman et al. | July 25, 1950 |
| 2,616,401 | Blair | Nov. 4, 1952 |
| 2,635,586 | Kuhn | Apr. 21, 1953 |